(12) United States Patent
Chen et al.

(10) Patent No.: US 12,556,077 B2
(45) Date of Patent: Feb. 17, 2026

(54) LINEAR VIBRATION MOTOR WITH ELASTIC MEMBER HAVING ELASTIC ARMS AND BENDING PORTIONS

(71) Applicant: AAC Microtech (Changzhou) Co., Ltd., Jiangsu (CN)

(72) Inventors: Weibo Chen, Changzhou (CN); Xiaorong Zhou, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 365 days.

(21) Appl. No.: 18/320,169

(22) Filed: May 18, 2023

(65) Prior Publication Data
US 2024/0283343 A1     Aug. 22, 2024

Related U.S. Application Data

(63) Continuation of application No. PCT/CN2023/076319, filed on Feb. 16, 2023.

(51) Int. Cl.
*H02K 33/02* (2006.01)

(52) U.S. Cl.
CPC ................. *H02K 33/02* (2013.01)

(58) Field of Classification Search
CPC .. H02K 7/1869; H02K 7/1876; H02K 7/1892; H02K 33/00; H02K 33/02; H02K 33/04; H02K 33/06; H02K 33/16; H02K 33/18; H02K 35/00; H02K 35/02; H02K 35/04; H02K 35/06; B06B 1/00; B06B 1/02; B06B 1/0215; B06B 1/0223; B06B 1/0269; B06B 1/0614; B06B 1/04; B06B 1/045; H02N 11/00; H02N 11/002; H02N 11/04

USPC .. 310/5, 15, 81, 80, 321, 20, 21, 25, 28–30, 310/36–37, 12.01–12.27, 24

See application file for complete search history.

(56) References Cited

U.S. PATENT DOCUMENTS

| | | | | |
|---|---|---|---|---|
| 8,258,657 | B2* | 9/2012 | Kim | H02K 15/02 |
| | | | | 310/28 |
| 8,643,229 | B2* | 2/2014 | Park | H02K 33/16 |
| | | | | 310/15 |
| 8,878,401 | B2* | 11/2014 | Lee | H02K 33/16 |
| | | | | 310/15 |
| 9,815,085 | B2* | 11/2017 | Chun | G06F 3/016 |
| 10,008,894 | B2* | 6/2018 | Mao | H02K 1/34 |
| 10,076,771 | B2* | 9/2018 | Xu | H02K 33/12 |
| 10,103,614 | B2* | 10/2018 | Guo | H02K 33/18 |
| 10,284,066 | B2* | 5/2019 | Huang | H02K 1/34 |
| 10,710,115 | B2* | 7/2020 | Huang | H02K 33/02 |
| 10,886,827 | B2* | 1/2021 | Liu | H02K 33/14 |
| 11,404,948 | B2* | 8/2022 | Liu | H02K 33/16 |

(Continued)

*Primary Examiner* — Maged M Almawri
(74) *Attorney, Agent, or Firm* — Wiersch Law Group

(57) ABSTRACT

A linear vibration motor includes a housing, a vibration assembly, and a stator assembly. The vibration assembly includes a mass block, a magnet fixed to the mass block, and an elastic member that drives the mass block to move back and forth. The elastic member includes a first fixation portion, a first elastic portion, a second fixation portion, a second elastic portion, and a third fixation portion. Along a first central axis of the first fixation portion, the first elastic portion and the second elastic portion are located on two sides of the first central axis and are asymmetric. The linear vibration motor has good reliability.

7 Claims, 4 Drawing Sheets

(56) References Cited

U.S. PATENT DOCUMENTS

| | | | | |
|---|---|---|---|---|
| 11,515,774 B2* | 11/2022 | Yan | H02K 33/16 |
| 2003/0227225 A1* | 12/2003 | Kaneda | H02K 33/18 | 310/81 |
| 2009/0096299 A1* | 4/2009 | Ota | B06B 1/045 | 310/25 |
| 2011/0006618 A1* | 1/2011 | Lee | H02K 33/16 | 310/25 |
| 2011/0074229 A1* | 3/2011 | Kim | H02K 15/14 | 310/29 |
| 2011/0101797 A1* | 5/2011 | Lee | H02K 33/16 | 310/29 |
| 2011/0115310 A1* | 5/2011 | Dong | H02K 33/16 | 310/28 |
| 2011/0316361 A1* | 12/2011 | Park | H02K 33/16 | 310/25 |
| 2012/0032535 A1* | 2/2012 | Park | H02K 35/02 | 310/25 |
| 2012/0049660 A1* | 3/2012 | Park | B06B 1/045 | 310/25 |
| 2012/0104875 A1* | 5/2012 | Park | H02K 33/16 | 310/25 |
| 2012/0112565 A1* | 5/2012 | Lee | H02K 33/16 | 310/20 |
| 2012/0153748 A1* | 6/2012 | Wauke | H02K 33/16 | 310/25 |
| 2012/0169151 A1* | 7/2012 | Dong | H02K 33/16 | 310/25 |
| 2012/0187780 A1* | 7/2012 | Bang | H02K 33/16 | 310/25 |
| 2012/0313459 A1* | 12/2012 | Zhang | H02K 33/18 | 310/25 |
| 2013/0229070 A1* | 9/2013 | Akanuma | H02K 33/00 | 310/25 |
| 2016/0013710 A1* | 1/2016 | Dong | H02K 33/16 | 310/25 |
| 2016/0084853 A1* | 3/2016 | Baldwin | G01N 33/74 | 435/6.12 |
| 2016/0226365 A1* | 8/2016 | Wang | H02K 33/16 |
| 2017/0033672 A1* | 2/2017 | Xu | H02K 33/16 |
| 2017/0117788 A1* | 4/2017 | Hou | H02K 1/34 |
| 2017/0126109 A1* | 5/2017 | Hara | H02K 33/16 |
| 2017/0341108 A1* | 11/2017 | Mao | H02K 33/00 |
| 2017/0373574 A1* | 12/2017 | Chai | H02K 33/00 |
| 2017/0373577 A1* | 12/2017 | Huang | H02K 33/18 |
| 2017/0373578 A1* | 12/2017 | Wu | H02K 33/16 |
| 2018/0026506 A1* | 1/2018 | Zhang | H02K 41/02 | 310/25 |
| 2018/0026511 A1* | 1/2018 | Akanuma | H02K 33/18 | 310/20 |
| 2018/0071779 A1* | 3/2018 | Mori | H02K 3/04 |
| 2018/0278137 A1* | 9/2018 | Zhu | H02K 33/18 |
| 2018/0297061 A1* | 10/2018 | Mao | H02K 5/04 |
| 2018/0297069 A1* | 10/2018 | Hua | B06B 1/045 |
| 2018/0297071 A1* | 10/2018 | Xu | B06B 1/045 |
| 2019/0036435 A1* | 1/2019 | Zhu | H02K 33/02 |
| 2019/0207496 A1* | 7/2019 | Takahashi | H02K 33/02 |
| 2019/0296627 A1* | 9/2019 | Takahashi | H02K 35/02 |
| 2020/0044256 A1* | 2/2020 | Cattaneo | H01M 4/73 |
| 2020/0044548 A1* | 2/2020 | Tang | H02K 33/18 |
| 2020/0052566 A1* | 2/2020 | Tao | H02K 33/16 |
| 2020/0278750 A1* | 9/2020 | Yeon | G06F 1/1643 |
| 2020/0389077 A1* | 12/2020 | Ma | H02K 33/16 |
| 2022/0368205 A1* | 11/2022 | Ma | H02K 33/16 |

* cited by examiner

LINEAR VIBRATION MOTOR WITH ELASTIC MEMBER HAVING ELASTIC ARMS AND BENDING PORTIONS

TECHNICAL FIELD

The present disclosure relates to a motor, and in particular, to a linear vibration motor applied to the field of mobile electronic products.

BACKGROUND

With the development of electronic technologies, portable consumer electronic products are becoming more and more popular, such as mobile phones, handheld game consoles, navigation apparatuses, or handheld multimedia entertainment devices. In these electronic products, linear vibration motors may generally be used for system feedback, such as mobile phone call prompts, information prompts, navigation prompts, and vibration feedback of game consoles.

A linear vibration motor in the related art includes a housing with a receiving space, a vibration assembly located in the receiving space, and a stator assembly fixed to the housing. The stator assembly includes a coil. The vibration assembly includes a mass block, a magnet, and an elastic member supporting the mass block in the receiving space. The coil is interacted with the magnet to generate a driving force to drive the vibration assembly to vibrate back and forth, thereby providing a sense of vibration.

However, in a structure of the linear vibration motor in the related art, the elastic member includes two elastic arms symmetrically arranged. Moreover, in the related art, the elastic arms have a linearly extending structure. During vibration, the elastic arms are prone to stress concentration and break due to sound, leading to low reliability of the linear vibration motor.

Therefore, there is a need to provide a new linear vibration motor to solve the above problem.

SUMMARY

Based on the above problem, the present disclosure proposes a linear vibration motor with high reliability.

In order to achieve the above objective, the present disclosure proposes a linear vibration motor. The linear vibration motor, includes: a housing with a receiving space; a vibration assembly received in the receiving space; and a stator assembly received in the receiving space. The vibration assembly includes a mass block received in the receiving space, a magnet fixed to the mass block, and an elastic member that drives the mass block to move back and forth. The stator assembly includes a coil arranged corresponding to the magnet. The elastic member includes a first fixation portion fixed to the housing, a first elastic portion extending from one end of the first fixation portion to the mass block, a second fixation portion extending from the first elastic portion to the mass block, a second elastic portion extending from the other end of the first elastic portion to the mass block, and a third fixation portion extending from the second elastic portion to be fixed to the mass block. Along a first central axis of the first fixation portion, the first elastic portion and the second elastic portion are asymmetrically located on two sides of the first central axis.

As an improvement, the first elastic portion includes a first elastic arm extending from the first fixation portion, a second elastic arm connected to the second fixation portion, and a first bending portion, the first elastic arm and the second elastic arm are connected by the first bending portion, and an extension direction of the first elastic arm intersects an extension direction of the second elastic arm.

As an improvement, the first elastic portion further includes a second bending portion extending from the second elastic arm and a third elastic arm extending from the second bending portion, the third elastic arm is connected to the second fixation portion, and an extension direction of the third elastic arm intersects the extension direction of the second elastic arm.

As an improvement, the first elastic portion further includes a third bending portion extending from the third elastic arm, and a fourth elastic arm extending from the third bending portion and connected to the second fixation portion, and an extension direction of the fourth elastic arm intersects the extension direction of the third elastic arm.

As an improvement, the first bending portion, the second bending portion, and the third bending portion are all arc-shaped.

As an improvement, an extension direction of the second elastic portion is linear.

As an improvement, an angle formed between the first elastic arm and the second elastic arm is an obtuse angle, and an angle formed between the third elastic arm and the fourth elastic arm is an obtuse angle.

As an improvement, an angle formed between the second elastic arm and the third elastic arm is a right angle.

As an improvement, two elastic members are disposed on two sides of the mass block along a vibrating direction, and the two elastic members are rotationally symmetric along a second central axis of the mass block perpendicular to the vibrating direction.

As an improvement, the mass block includes a fixed surface fixed to the elastic member, and the second fixation portion and the third fixation portion are respectively fixed to two ends of the fixed surface along a direction perpendicular to a vibrating direction.

Compared with the related art, the linear vibration motor according to the present disclosure includes a housing with a receiving space and a vibration assembly and a stator assembly that are received in the receiving space. The vibration assembly includes a mass block received in the receiving space, a magnet fixed to the mass block, and an elastic member that drives the mass block to move back and forth. The elastic member includes a first fixation portion fixed to the housing, a first elastic portion extending from one end of the first fixation portion to the mass block, a second fixation portion extending from the first elastic portion to the mass block, a second elastic portion extending from the other end of the first elastic portion to the mass block, and a third fixation portion extending from the second elastic portion to be fixed to the mass block. Along a first central axis of the first fixation portion, the first elastic portion and the second elastic portion are located on two sides of the first central axis and are asymmetric. The first elastic portion and the second elastic portion are arranged to be asymmetric, which can effectively prevent a risk of fracture caused by stress concentration on the elastic member, and significantly improve reliability of the linear vibration motor. Moreover, through adjustment of the asymmetric structure of the first elastic portion and the second elastic portion, F0 and modality can be adjusted, which increases a design space of the linear vibration motor.

DESCRIPTION OF EMBODIMENTS

The technical solution of the present disclosure is clearly and completely described below with reference to the accompanying drawings and specific embodiments.

Figure 1:
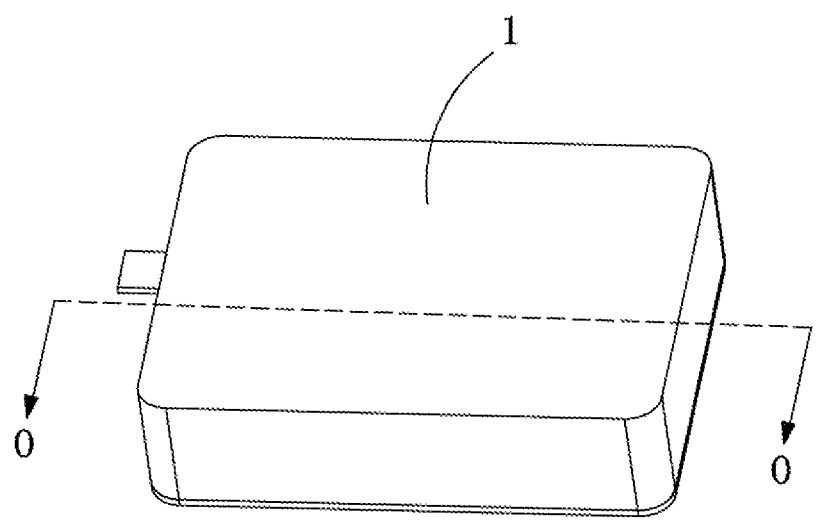
FIG. 1 is a perspective view of a linear vibration motor according to an embodiment of the present disclosure.
Figure 2:
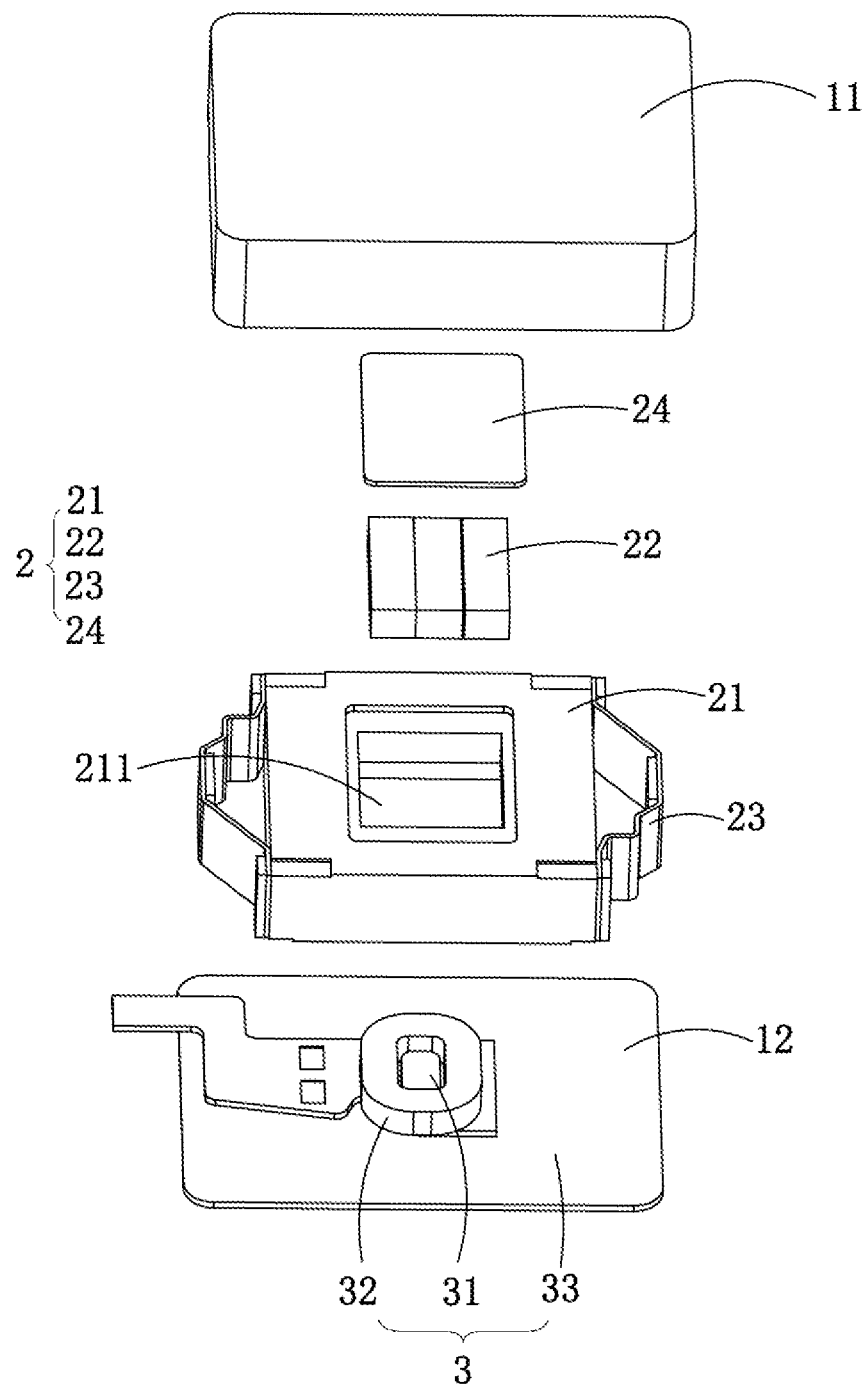
FIG. 2 is an exploded view of the linear vibration motor according to an embodiment of the present disclosure.

As shown in FIG. 1 to FIG. 2, the present disclosure provides a linear vibration motor 100. The linear vibration motor 100 includes a housing 1 with a receiving space 10, and a vibration assembly 2 and a stator assembly 3 that are received in the receiving space 10.

The housing 1 includes an upper housing 11 with a receiving space and a lower cover 12 fixed to the upper housing 11. The upper housing 11 and the lower cover 12 enclose to form the receiving space 10.

As shown in FIG. 2, the vibration assembly 2 includes a mass block 21 received in the receiving space 10, a plurality of magnets 22 fixed to the mass block 21, an elastic member 23 that drives the mass block 21 to move back and forth, and a pole plate 24 fixed to the mass block 21. The mass block 21 is provided with a through hole 211 passing therethrough, multiple magnets 22 are received in the through hole 211, and the pole plate 24 covers the magnet 22 and covers the through hole 211. In this embodiment, three magnets 22 are provided.

The stator assembly 3 includes an iron core 31, a coil 32 wound around an outer side of the iron core 31, and a flexible printed circuit board 33 externally connecting the coil 32 with an external circuit. The flexible printed circuit board 33 is fixed to the lower cover 12. The coil 32 is fixed to a side of the flexible printed circuit board 33 facing the mass block 21 and arranged opposite to and apart from the magnet 22. The coil 3 is arranged opposite to the magnet 22 and generates an interaction force to drive the mass block 21 and the magnet 22 to vibrate back and forth.

Figure 3:
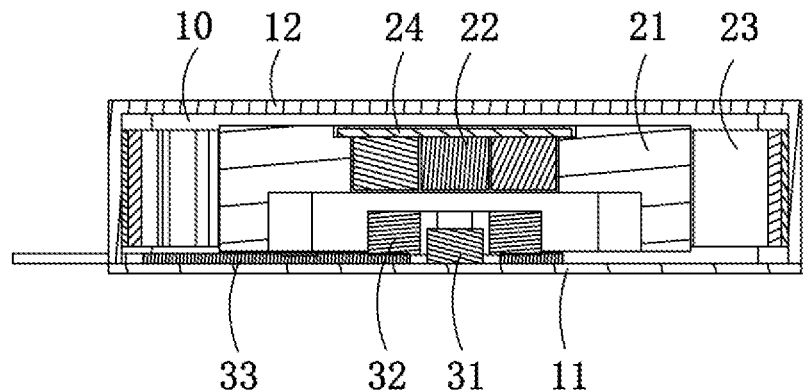
FIG. 3 is a sectional view taken along a line O-O in FIG. 1.
Figure 4:
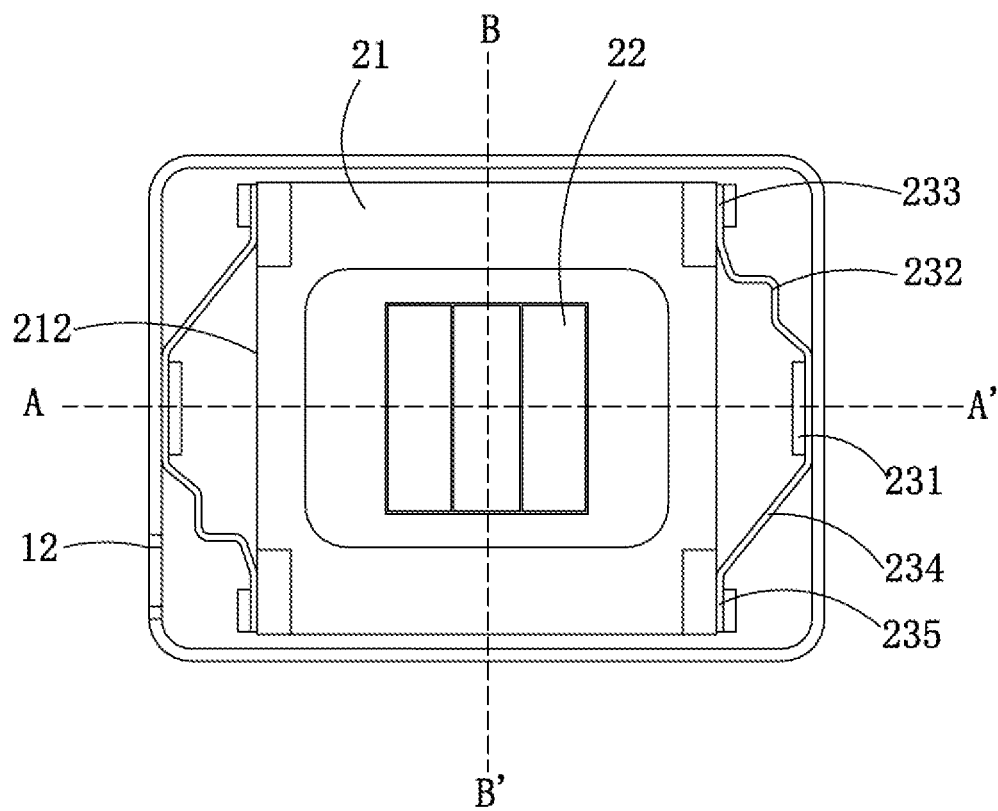
FIG. 4 is a perspective view of a partial structure of the linear vibration motor according to an embodiment of the present disclosure.

As shown in FIG. 2 to FIG. 4, the elastic member 23 includes a first fixation portion 231 fixed to the upper housing 11, a first elastic portion 232 extending from one end of the first fixation portion 231 to the mass block 21, a second fixation portion 233 extending from the first elastic portion 232 to the mass block 21, a second elastic portion 234 extending from the other end of the first elastic portion 232 to the mass block 21, and a third fixation portion 235 extending from the second elastic portion 234 to be fixed to the mass block 21. Along a first central axis AA' of the first fixation portion 231, the first elastic portion 232 and the second elastic portion 234 are located on two sides of the first central axis AA' and are asymmetric. It may be understood that the first central axis AA' is parallel to a vibrating direction of the linear vibration motor 100. The mass block 21 includes a fixed surface 212 fixed to the elastic member 23, and the second fixation portion 233 and the third fixation portion 235 are respectively fixed to two ends of the fixed surface 212 along a direction perpendicular to the vibrating direction.

In this embodiment, two elastic members 23 are provided, the two elastic members 23 are respectively arranged on two sides of the mass block 21 along the vibrating direction, and along a second central axis BB' of the mass block 21 perpendicular to the vibrating direction, the two elastic members 23 have a rotationally symmetric structure.

Figure 5:
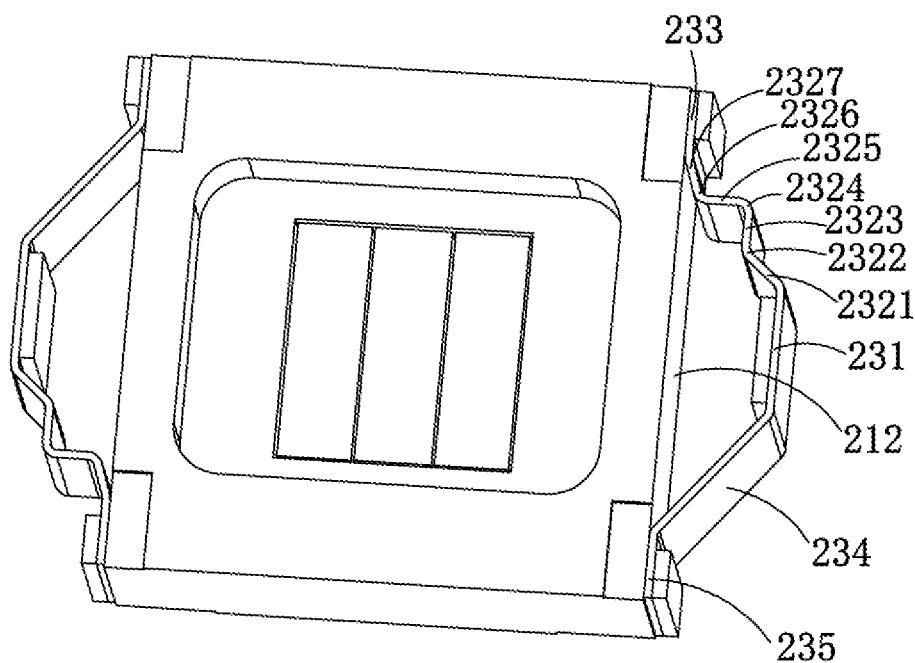
FIG. 5 is a perspective view of a partial structure of the linear vibration motor according to an embodiment of the present disclosure.

As shown in FIG. 4 to FIG. 5, the first elastic portion 232 includes a first elastic arm 2321 extending from the first fixation portion 231, a first bending portion 2322 extending from the first elastic arm 2321, a second elastic arm 2323 extending from the first bending portion 2322, a second bending portion 2324 extending from the second elastic arm 2323, a third elastic arm 2325 extending from the second bending portion 2324, a third bending portion 2326 extending from the third elastic arm 2325, and a fourth elastic arm 2327 extending from the third bending portion 2326 and connected to the second fixation portion 233.

An extension direction of the second elastic portion 234 is linear. That is, the second elastic portion 234 is a linear elastic piece, which does not have a bent structure.

An extension direction of the first elastic arm 2321 intersects an extension direction of the second elastic arm 2323. An angle formed between the first elastic arm 2321 and the second elastic arm 2323 is an obtuse angle. An extension direction of the third elastic arm 2325 intersects the extension direction of the second elastic arm 2323. An angle formed between the second elastic arm 2323 and the third elastic arm 2325 is an obtuse angle. An extension direction of the fourth elastic arm 2327 intersects the extension direction of the third elastic arm 2325. Specifically, an angle formed between the third elastic arm 2325 and the fourth elastic arm 2327 is an obtuse angle. Further, the first bending portion 2322, the second bending portion 2324, and the third bending portion 2326 are all arc-shaped.

In this embodiment, an opening formed between the first elastic arm 2321 and the second elastic arm 2323 and an opening formed between the second elastic arm 2323 and the third elastic arm 2325 face opposite directions. An opening formed between the second elastic arm 2323 and the third elastic arm 2325 and an opening formed between the third elastic arm 2325 and the fourth elastic arm 2327 face opposite directions.

Compared with the related art, the linear vibration motor according to the present disclosure includes a housing with a receiving space and a vibration assembly and a stator assembly that are received in the receiving space. The vibration assembly includes a mass block received in the receiving space, a magnet fixed to the mass block, and an elastic member that drives the mass block to move back and forth. The elastic member includes a first fixation portion fixed to the housing, a first elastic portion extending from one end of the first fixation portion to the mass block, a second fixation portion extending from the first elastic portion to the mass block, a second elastic portion extending from the other end of the first elastic portion to the mass block, and a third fixation portion extending from the second elastic portion to be fixed to the mass block. Along a first central axis of the first fixation portion, the first elastic portion and the second elastic portion are located on two sides of the first central axis and are asymmetric. The first elastic portion and the second elastic portion are arranged to be asymmetric, which can effectively prevent a risk of fracture caused by stress concentration on the elastic member, and significantly improve reliability of the linear vibration motor. Moreover, through adjustment of the asymmetric structure of the first elastic portion and the second elastic portion, FO and modality can be adjusted, which increases a design space of the linear vibration motor.

The above descriptions are only embodiments of the present disclosure. It should be pointed out herein that, for those of ordinary skill in the art, improvements can also be made without departing from the creative concept of the present disclosure, all of which fall within the protection scope of the present disclosure.

What is claimed is:

1. A linear vibration motor, comprising:

a housing with a receiving space;

a vibration assembly received in the receiving space; and a stator assembly received in the receiving space;

wherein the vibration assembly comprises a mass block received in the receiving space, a magnet fixed to the mass block, and an elastic member that drives the mass block to move back and forth;

wherein the stator assembly comprises a coil arranged corresponding to the magnet;

wherein the elastic member comprises a first fixation portion fixed to the housing, a first elastic portion extending from one end of the first fixation portion to the mass block, a second fixation portion extending from the first elastic portion to the mass block, a second elastic portion extending from the other end of the first elastic portion to the mass block, and a third fixation portion extending from the second elastic portion to be fixed to the mass block; and wherein along a first central axis of the first fixation portion, the first elastic portion and the second elastic portion are asymmetrically located on two sides of the first central axis;

wherein the first elastic portion comprises a first elastic arm extending from the first fixation portion, a second elastic arm connected to the second fixation portion, and a first bending portion, the first elastic arm and the second elastic arm are connected by the first bending portion, and an extension direction of the first elastic arm intersects an extension direction of the second elastic arm;

wherein the first elastic portion further comprises a second bending portion extending from the second elastic arm and a third elastic arm extending from the second bending portion, the third elastic arm is connected to the second fixation portion, and an extension direction of the third elastic arm intersects the extension direction of the second elastic arm;

wherein the first elastic portion further comprises a third bending portion extending from the third elastic arm, and a fourth elastic arm extending from the third bending portion and connected to the second fixation portion, and an extension direction of the fourth elastic arm intersects the extension direction of the third elastic arm.

2. The linear vibration motor as described in claim 1, wherein the first bending portion, the second bending portion, and the third bending portion are all arc-shaped.

3. The linear vibration motor as described in claim 1, wherein an extension direction of the second elastic portion is linear.

4. The linear vibration motor as described in claim 1, wherein an angle formed between the first elastic arm and the second elastic arm is an obtuse angle, and an angle formed between the third elastic arm and the fourth elastic arm is an obtuse angle.

5. The linear vibration motor as described in claim 1, wherein an angle formed between the second elastic arm and the third elastic arm is a right angle.

6. The linear vibration motor as described in claim 1, wherein two elastic members are disposed on two sides of the mass block along a vibrating direction, and the two elastic members are rotationally symmetric along a second central axis of the mass block perpendicular to the vibrating direction.

7. The linear vibration motor as described in claim 1, wherein the mass block comprises a fixed surface fixed to the elastic member, and the second fixation portion and the third fixation portion are respectively fixed to two ends of the fixed surface along a direction perpendicular to a vibrating direction.

* * * * *